United States Patent

Ajimi et al.

[11] Patent Number: 5,813,802
[45] Date of Patent: Sep. 29, 1998

[54] DRILLING TOOL ASSEMBLY AND ITS CENTER DRILL AND CUP SHAPE DRILL

[75] Inventors: Kunio Ajimi; Tsuneyoshi Ajimi, both of Higashiosaka, Japan

[73] Assignee: House B.M. Co., Ltd., Higashiosaka, Japan

[21] Appl. No.: 757,815

[22] Filed: Nov. 27, 1996

[30] Foreign Application Priority Data

Nov. 30, 1995 [JP] Japan ................................. 7-312409
Apr. 9, 1996 [JP] Japan ................................. 8-086823
May 9, 1996 [JP] Japan ................................. 8-114814

[51] Int. Cl.$^6$ ................................................. B23B 47/00
[52] U.S. Cl. ........................... 408/68; 408/204; 408/207; 408/224; 175/403
[58] Field of Search ................................. 408/68, 67, 204, 408/206, 207, 209, 224, 225, 226; 175/403

[56] References Cited

U.S. PATENT DOCUMENTS

| | | | |
|---|---|---|---|
| 3,390,596 | 7/1968 | Trevathan | 408/68 |
| 4,322,187 | 3/1982 | Hougen | 408/204 |
| 4,500,234 | 2/1985 | Orth et al. | 408/204 |
| 4,693,644 | 9/1987 | Takahashi | 408/207 |
| 4,966,502 | 10/1990 | Magyari | 408/204 |
| 4,968,192 | 11/1990 | Hamilton | 408/188 |
| 5,035,548 | 7/1991 | Pidgeon . | |
| 5,096,341 | 3/1992 | Despres | 408/68 |
| 5,171,111 | 12/1992 | Kishimoto | 408/67 |
| 5,417,526 | 5/1995 | Stock et al. . | |
| 5,435,672 | 7/1995 | Hall et al. | 408/68 |

FOREIGN PATENT DOCUMENTS

| | | | |
|---|---|---|---|
| 904860 | 6/1944 | France | 408/68 |
| 3322887 | 1/1985 | Germany | 408/204 |
| 91 10 056 | 11/1991 | Germany . | |
| WO 89 10815 | 11/1989 | WIPO . | |

*Primary Examiner*—Daniel W. Howell
*Assistant Examiner*—Adesh Bhargava
*Attorney, Agent, or Firm*—Fish & Richardson P.C.

[57] ABSTRACT

A center drill used for machining a hole in a work piece which is adapted to be partially enclosed in a cup shape drill member in a side view thereof, includes a drill portion provided on a leading end of the center drill, and a dust extractor radially outwardly extending from a portion of the center drill which is enclosed in the cup shape drill member.

17 Claims, 12 Drawing Sheets

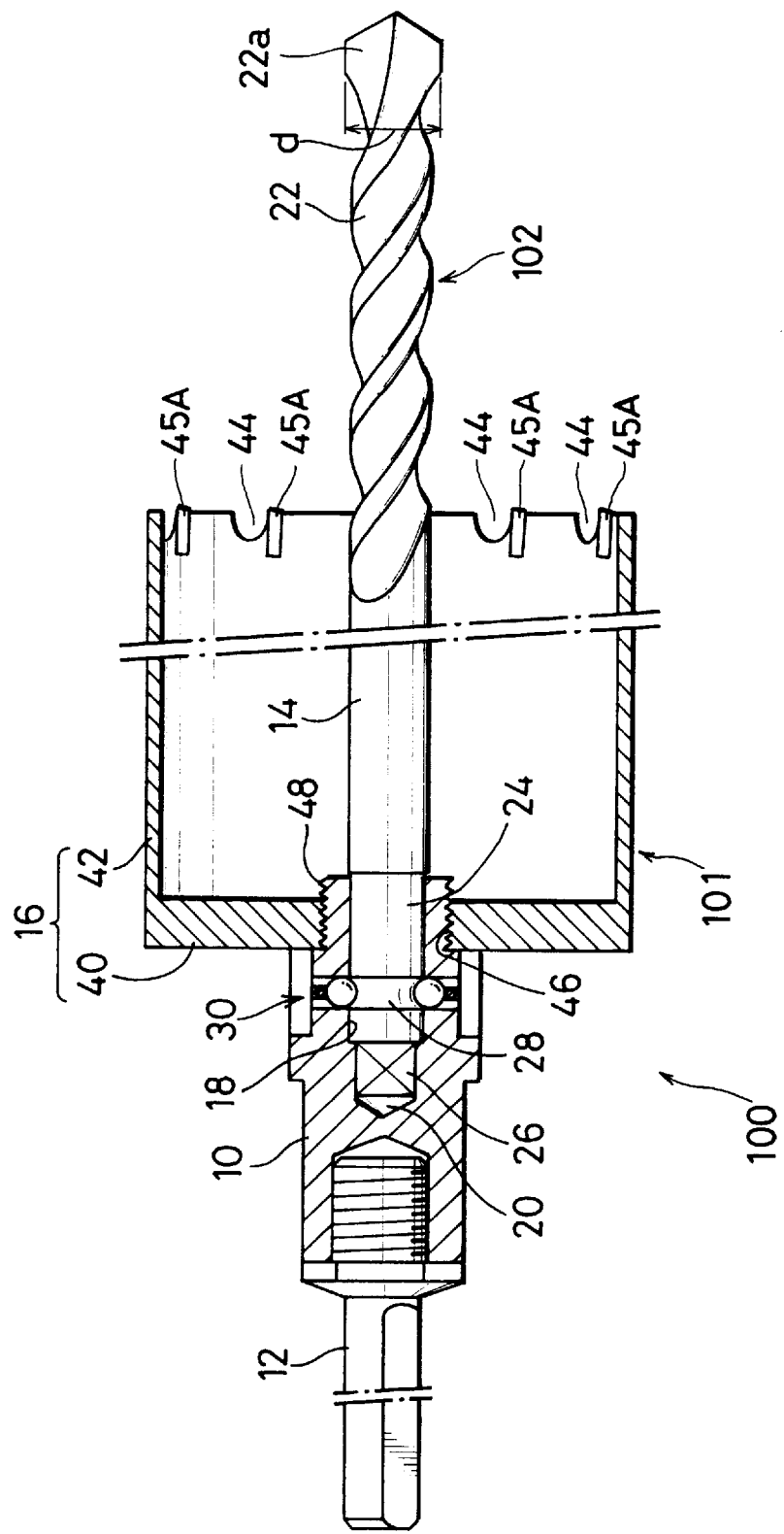

DRILLING TOOL ASSEMBLY AND ITS CENTER DRILL AND CUP SHAPE DRILL

BACKGROUND OF THE INVENTION AND RELATED ART STATEMENT

This invention relates to a drilling tool assembly including a center drill and a cup shape drill used for forming a circular hole in a work piece. The invention also relates to each member of the drilling tool assembly; namely a center drill and a cup shape drill.

One conventional example of the drilling tool assembly of the above-mentioned type is illustrated in FIG. 12A. This type of the tool includes a tool holding portion 90, to a middle portion thereof a center drill 92 is detachably mountable, and a tubular body 94 which is coaxially mounted onto the holding portion with the center drill. The center drill is provided with a drill portion at the leading end thereof. The tubular body 94 is provided with a plurality of cutting tips 93 on the forward end thereof. The tip of the drill portion is set to project forward from the end of the tubular body 94.

With the aforementioned type of the drilling tool assembly, the drilling operation is carried out in the following manners: At first the drilling portion is driven at high speed and a leading end of the center drill 92 is pressed onto the work piece (such as a wall member) and a guide hole is being machined with the center drill 92. And subsequently a circular path around the guide hole of a radius approximately equal to the tubular member (also referred to as a cup shape drill member) is machined with the plurality of tips formed on the leading end of the tubular member as the drilling tool assembly is further pressed onto the work. Then at the end a circular opening with a diameter substantially equal to an outer diameter of the tubular body is formed in the work.

However, at some point after an initiation of drilling operation, a space formed between the tubular body 94 and the center drill 92 is being filled with fragments and dust as shown in FIG. 12B. At this point it requires to extract the dust filling this space to carry on the next drilling operation.

Conventional methods of extracting the dust accumulated in the space are described in the following.

a) As shown in FIG. 13, through holes 97 of a relatively small diameter are formed in the base portion of a tubular member and a pair of extracting rods 98 are inserted through these holes and dust accumulation 95 in the space can be pushed out of the tubular member 94;

b) Not only is the center drill 92 detachable from the tool holding portion 90 but also the cup shape drill member 94 is designed to be detachable from the tool holding portion 90. The drilling tool assembly thus constructed can extract the dust accumulated in the inner space of the cup shape drill member as the cup shape drill member 94 being disassembled from the drill tool assembly.

In the case of structure in the above a) to withdraw dust accumulation out of the cup shape drill member, it requires to use such as a pushing rod 98 as shown in FIG. 13 which can only be used for this purpose thereby rendering an increase of the necessary tools for the drilling operation. In addition, the base portion of the cup shape drill member is formed with a pair of holes (or alternately a single hole) thus it in some degree lessens the mechanical strength of this base portion against a certain directional force applied thereto.

In case of the structure described in the above b), it requires to dismount the cup shape drill member which has a significantly larger diameter than the center drill. It therefore takes a greater effort to conduct such a dismounting work thereby lowering the productivity of the drilling operation. In fact there has been conducted various kinds of modifications in an attempt to ease such dismounting operation. Such modifications were aimed to design an attaching structure which enables dismount of the cup shape drill member from the tool holding portion with ease; however, such attaching structure necessitates complicated machining steps performed on both the tool holding portion 90 and the cup shape drill member. Thus an increase in an initial cost of the drilling tool assembly has been unavoidable.

Accordingly it is an object of this invention to overcome the aforementioned drawbacks residing in the prior art technology to provide a drilling tool assembly enabling an easy withdrawing of dust accumulation out of the cup shape drill member.

SUMMARY OF THE INVENTION

To overcome the aforementioned problems of the prior art, the present invention has an object to provide a simple and inexpensive drilling tool assembly and its components enabling an easy dust extracting operation.

To achieve the above object according to this invention, a center drill that is to be combined with a cup shape drill member for machining a hole in a work piece comprises a drill portion provided on a leading end of the center drill, and a dust extractor radially outwardly extending from a portion of the center drill which is inwardly of the cup shape drill member when combined with the cup shape drill member.

Dust produced during the drilling operation which is to be accumulated in a space defined by the inner surface of cup shape drill member and outer surface of the center drill. The dust extractor of the center drill engages with an innermost of the dust accumulation as the center drill is pulled out axially from the cup shape drill member. The dust extractor thus pushes the dust accumulation from innermost side of the cup shape member to the opening end as the center drill is pulled out axially from the cup shape drill. Thus the dust accumulation is easily extracted from the cup shape drill member along with the removal operation of the center drill. Thus with this center drill member, the through holes in the base portion of the cup shape drill shown in FIG. 13 can be obviated. In addition, it can also obviate the need for the complicated mechanism which had been required in the conventional examples mentioned in the above.

It should be noted that the term dust used in this context and throughout the description includes fine dust generated during the drilling operation and chips (or small fragments) also generated during the drilling operation. The term dust accumulation used throughout the description is meant to be a cylindrical shape dust accumulation filling a space of the cup shape drill during or after the drilling operation unless otherwise indicated specifically. Therefore the dust accumulation includes larger fragments of the work piece removed from the work piece and smaller fragments and dust generated during the drilling operation.

In one form of the invention, the dust extractor may be in a form of flange having a diameter greater than a drill portion of the center drill and smaller than an inner diameter of the cup shape drill member. Furthermore the diameter of the flange may be set substantially equal to the inner diameter of the cup shape drill member. With this arrangement, fine dusts including small fragments of the work piece produced during the drilling operation can not be easily pass through the clearance defined between the periphery of the flange and an inner surface of the cup shape drill member, thus the portion of the fine dust passing through the clearance to reach innermost portion of the cup shape drill is lessened compared to the case where the clearance is larger.

A cross sectional shape of the flange may be set in a concave opening toward the drill portion of the center drill.

With this arrangement, fine dust generated during the drilling operation is securely held within a recess of the concave portion. Thus combining this feature with the small clearance between the flange member and inner surface of the cup shape drill member enables highly efficient dust collection in the space. Thus all those dusts collected can be extracted by the removal operation of the center drill.

In one form of the invention, the dust extractor lies on a portion of the circumference of the outer surface of the center drill. In order to merely achieve the object that the dust accumulation is extracted along with the center drill removal operation, mere dust extractor on the outer surface of the center drill will do as long as it is suitably positioned in an axial direction. Specifically, the suitable axial position of the dust extractor is such that the dust extractor is in the cup shape drill member when assembled to form a drilling tool assembly and the axial distance of the dust extractor from the opening end of the cup shape drill exceeds the thickness of the work piece.

Moreover, the dust extractor may extend through the radial direction of the center drill. With this arrangement, it is easy to make a dust extractor such that a simple pin of the standard size radially penetrating the center drill can function as a dust extractor.

Furthermore, the dust extractor may be constructed in a form of ring member. With this structure, the dust extractor will not be lost regardless of the axial movement of the center drill with respect to the cup shape drill member.

The dust extractor may also be in a form of a split ring having a cutout and opposite ends of the ring lie in a through hole formed on the center drill. With this feature, it is made easy to install the dust extractor such that first expanding the opposite ends of the ring overcoming the elastic force thereof to slide along the outer surface of the center drill in a lateral direction to align ends of the ring with the respective openings. Once alignment is done, then just let the ends restore its original posture to be securely held in the through hole provided in the center drill member.

Preferably, the dust extractor may be detachably attached to the center drill. With this feature, when the replacement of the cup shape drill member becomes necessary, it may be possible to keep the same dust extractor on the center drill to merely achieve the object of this invention. However, it may be greatly appreciated having this detachable feature as it allows an easy replacement of the dust extractor which best suits to the replaced cup shape drill member in terms of the clearance defined therebetween In another form of the invention, a center drill may further comprise a cup shape drill member which includes a base member and a tubular body extending from the outer periphery of the base member, having a plurality of tips mounted on an opening end of the tubular body.

Yet another form of the invention takes in a form of a cup shape drilling tool which comprises a tubular body including a plurality of cutting tips provided on a periphery of a leading end of the tubular body, having at least one inwardly protruding tip which projects further radially inwardly of the rest of the cutting tips and all the inwardly protruding tips lie in a half side of one end of the tubular member.

The cutting tips may include a plurality of the inwardly protruding tips and the plurality of inwardly protruding tips are successively arranged on the leading end of the tubular member.

The leading end of the inwardly protruding tip may be set backward of a leading end of the other cutting tips in an axial direction of the drilling tool.

With this arrangement, when pressing the drilling tool assembly against the work piece such as a wall, the first contact is made with cutting tips other than the inwardly protruding tip. Then circular groove of diameter corresponding to the cutting tips is formed on the wall surface and when the tool assembly further advances in the axial direction, then the inwardly protruding tip makes contact with the work piece. However, the inwardly protruding tip mostly machines the outer periphery of the groove made by the cutting tips other than inwardly protruding tip. Thus actual cutting resistance acting upon the inner protruding tip is greatly lessened. Furthermore, it is possible to adjust the amount of radial projection of the inwardly protruding tip to optimize flow of the dusts generated during the drilling operation as it is expected that further projection makes a radial dimension of the circular path through which dust can flow larger rendering improvement of the cutting performance whereas further projection increases a cutting resistance. Accordingly there must exist a suitable projection amount of inwardly protruding tip to substantially improve the drilling performance. After completion of the drilling operation, the center drill is first pulled out of the tool chucking device, then by tapping the outer surface of the cup shape drill, the dust accumulation in the cup shape drill can be shifted to a lateral side opposing to the side where there are provided with a plurality of inwardly protruding tips since there exist a clearance in a radial direction between the outer periphery of the dust accumulation assuming this is in a shape of cylinder and a radius of the non-inwardly protruding tips. Once the dust accumulation is shifted laterally by a small amount, then no adhering force acts between the inwardly protruding tips and the outer surface of the dust accumulation, it is easy to take the dust accumulation out of the cup shape drill assembly.

Still another form of this invention, a cup shape drilling tool assembly comprises: a cup shape drill member including a cutting tip on a leading end thereof and a center drill partially enclosed in the cup shape drill member in a side view thereof, including a drill portion provided on a leading end of the center drill and a dust extractor radially outwardly extending from a portion of the center drill lying in the cup shape drill member; and a tool chucking device for securely holding the center drill at a middle of the cup shape drill member in a plan view.

Dust produced during the drilling operation is to be accumulated in a space defined by the inner surface of cup shape drill member and outer surface of the center drill. The dust extractor of the center drill engages with the innermost of the dust accumulation as the center drill is pulled out axially from the cup shape drill member. The dust extractor thus pushes the dust accumulation from the innermost of the cup shape drill member to the opening end as the center drill is pulled out axially from the cup shape drill member. Thus the dust accumulation is easily extracted from the cup shape drill member along with the removal operation of the center drill. Thus with this center drill member, the through holes in the base portion of the cup shape drill shown in FIG. 13 can be obviated. In addition, complicated mechanism which had been required in the conventional examples mentioned in the above can also be obviated.

Yet another form of the invention takes in a cup shape drilling tool assembly which comprises: a cup shape drill member including a plurality of cutting tips provided on a periphery of an opening end of the cup shape drill member, having at least one inwardly protruding tip which projects further radially inwardly of the rest of the cutting tips and all the inwardly protruding tips lie in an arc of 180 degree at one end of the cup shape drill member; and a center drill partially enclosed in the cup shape drill member in a side view thereof, including a drill portion formed on a leading end of the center drill projects axially outwardly from the opening end of the cup shape drill member; and a tool chucking device for securely holding the center drill at a middle of the cup shape drill member in a plan view.

With this arrangement, after completion of the drilling operation, the center drill is first pulled out of the tool chucking device, then by tapping the outer surface of the cup shape drill, the dust accumulation in the cup shape drill can be shifted to a lateral side opposing to the side where there are provided with a plurality of inwardly protruding tips since there exists a clearance in a radial direction between the outer periphery of the dust accumulation assuming this is in a shape of cylinder and a radius of the non-inwardly protruding tips. Once the dust accumulation is shifted laterally by a small amount, then no adhering force acts between the inwardly protruding tips and the outer surface of the dust accumulation, it is easy to take the dust accumulation out of the cup shape drill assembly.

It would be appreciated that the center drill may be detachably attached to the tool chucking device. A diameter of the drill portion is preferably set larger than one of an axially rearward portion of the center drill. With this feature, after completion of the drilling operation, the center drill needs not be removed from the tool chucking device to laterally shift the dust accumulation inside of the cup shape drill. Because there apparently exists a clearance between the portion of the drill axially rearward of the drill portion and the inner surface of the dust accumulation since the inner diameter of the dust accumulation is approximately equal to the diameter of the drill portion which is larger than the diameter of the rearward portion of the center drill. Accordingly when the cup shape drilling tool assembly is tapped lightly, then there expected a lateral movement of the dust accumulation by an amount within the radial clearance formed by the difference in diameter between the drilling portion and the portion rearward of the drilling portion. Once the dust accumulation is fled from the adhesion to the inwardly protruding tips, then the dust accumulation is extracted from the cup shape drill member easily along with the removal of the center drill.

These and other objects, features and advantages of the invention will become apparent upon reading the following detailed description of the preferred embodiments with reference to the accompanied drawings.

BRIEF DESCRIPTION OF THE DRAWINGS

FIG. 7 is a cross sectional side view illustrating a drilling tool assembly according to a second embodiment of the invention;

DETAILED DESCRIPTION OF THE PREFERRED EMBODIMENT OF THE INVENTION

A drilling tool assembly according to a first embodiment of this invention is hereinafter described with reference to FIGS. 1 to 4.

Figure 1:
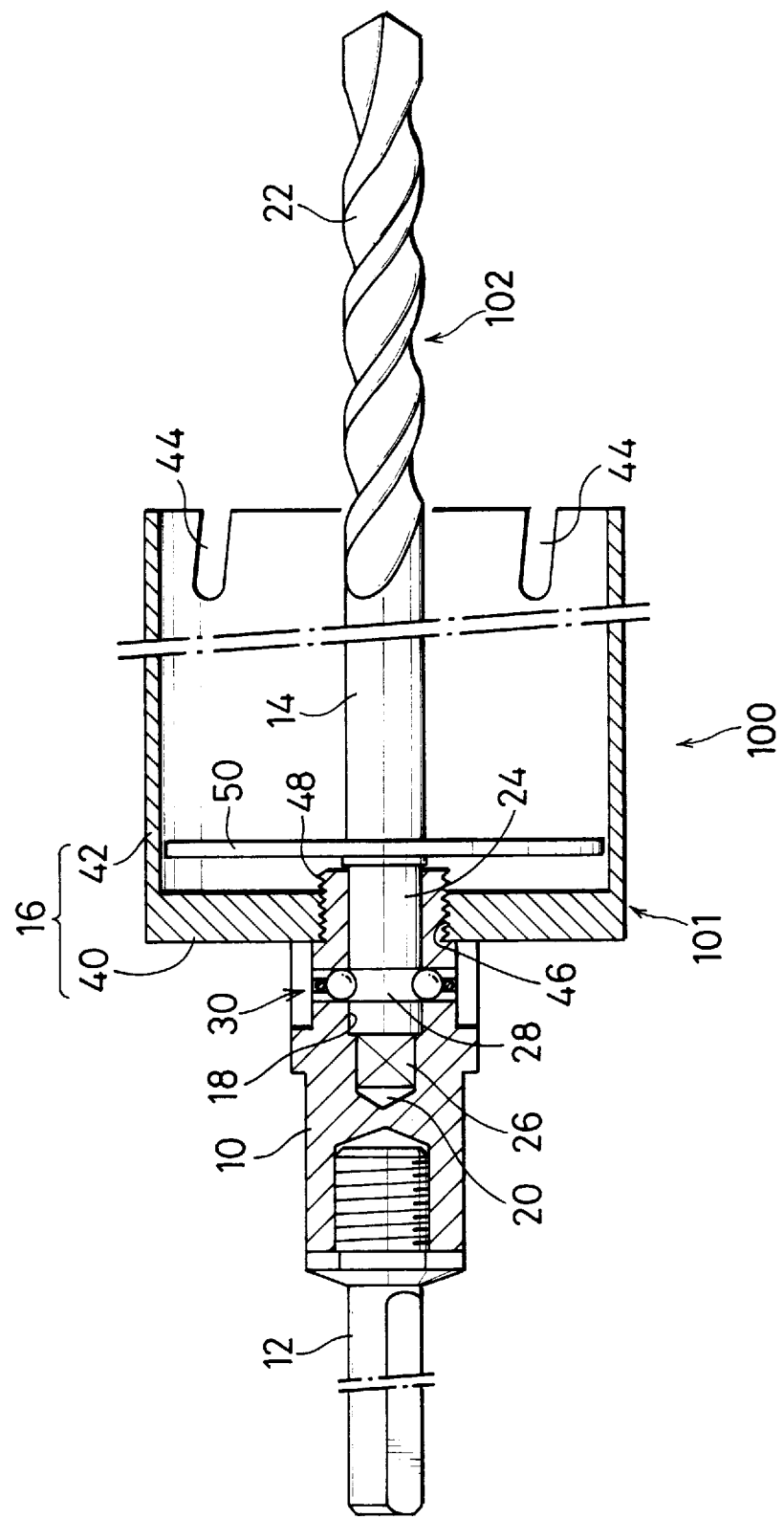
FIG. 1 is a sectional side view illustrating a drilling tool assembly according to a first embodiment of the invention.

The drilling tool assembly (or also referred to as a tool assembly) is provided with a tool holding portion 10 as shown in the FIG. 1. The tool holding portion 10 has a base portion (left end in FIG. 1) and a tool connection portion 12 which is fixed onto the base portion. The tool holding portion 10 has an opposite end (right end in FIG. 1) to which a center drill 102 and a base plate 40 of a cup shape drill member 101 are to be coaxially mounted. Provided that the tool connecting portion 12 is connected to an unillustrated drive source, the tool holding portion 10, the center drill 102 and the cup shape drill member 101 are driven together in an integral form.

A leading end of the aforementioned tool holding portion 10 for mounting the center drill 102 is formed with a mounting hole 18 having a circular cross sectional shape extending along a center axis of the tool holding portion 10. At the innermost end of the hole 18 an insertable hole 20 with non circular cross section is formed. The center drill 102 has a drill portion on the leading end and a circular shaped mounting portion 24 on the other end which can be fit into the mounting hole 18. At the end of the mounting portion 24, there is also provided a non-circular shaped projection 26 which can be fit into the insertable hole 20. Because of the fitness of non-circular shaped projection 26 into the corresponding non-circular shape insertable hole 20, it is made possible to fix a relative angular position of the center drill 102 with respect to the tool holding member 10.

At the halfway along the lengthwise direction of the mounting portion 24 of the center drill 102, there is formed a circumference groove 28 extending around the circular mounting portion. On an inner circumferential surface of the holding hole 18, there is formed an engaging portion 30 for engagement with the groove 28. In more details, there are provided two through holes 32 allowing communication between an exterior of the tool holding member 10 and the holding hole 18 and a ball 34 having a proper diameter engaging the groove formed around the outer surface of the holding portion of the center drill is placed into each through hole 32. In addition, around the outer surface of the tool holding member 10 and at the through hole 32 in the lengthwise direction, there is formed a circumferential groove 36 and a C shaped expandable member 38 is fit into the groove 36. Due to this elastic restoration force into a radially contracting direction, the balls 34 each is biased radially inward thereby being maintained is the state of engagement between the balls 34 and the circumferential groove 28, i.e. an engagement state of the centering drill 102.

In this invention, a construction of the removable structure is not limited to the certain type described above, thus it could be in the form such as a hollow tool holding portion having a transverse through threaded hole on the side surface thereof with a screw bolt engaging through the threaded hole and the leading end of the screw bolt pressing the chucking portion of the center drill against the inner surface of the tool holding portion.

The cup shape drill member 101 has a donut shape base portion 40 and a tubular member 42 extending from the outer periphery of the base plate in an axial direction. The tubular member 42 forms a plurality of cutouts 44 at the distant end thereof and a plurality of cutting tips (see FIGS. 7 and 8) that are provided around the respective cutouts 44. The base plate 40, the tubular member 42 and the cutouts 44 and respective cutting tips 45A constitute a cup shape drill member 101. Since the inner thread 46 is provided on the inner surface of the donut shaped base member 40 and the outer thread 48 mating with the inner thread 46 is formed on the leading end of the tool holding portion 10, the cup shape drill member 101 is engageable with the tool holding portion 10. The length of the center drill is set such that when the cup shape drill member 101 is securely fastened to the holding portion 10, the drill portion 22 of the center drill 102 projects (rightward direction in FIG. 1) further away from the tip portion of the tubular member 42.

Figure 2:
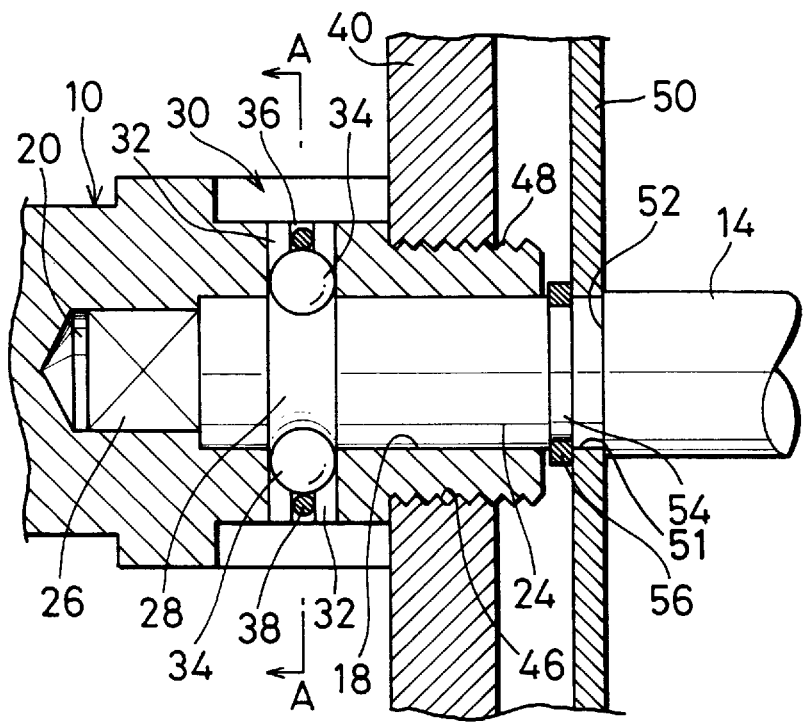
FIG. 2 is a cross sectional side view illustrating a holding mechanism of a center drill of the drilling tool assembly.
Figure 3:
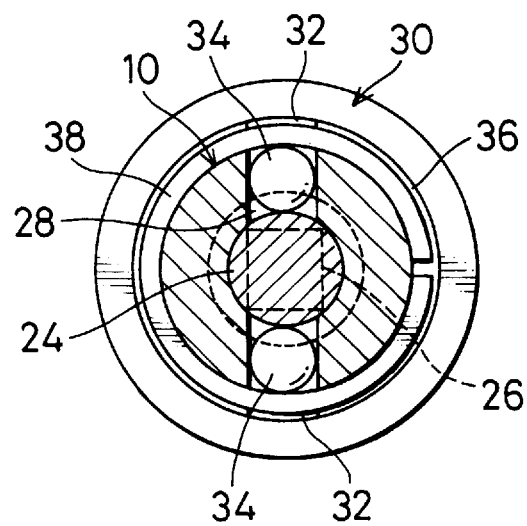
FIG. 3 is a cross-sectional side view taken along line III—III shown in FIG.2.

The significant character of this drilling tool assembly 100 is to equip a flange portion 50 on the center drill 102 as shown in FIGS. 1 and 2. Such flange 50 is formed in the donut shape with a hole 51 in the middle thereof fitting onto the outer surface of the chucking portion of the center drill 102. The diameter of hole 51 is set such that it is slightly smaller than the outer diameter of the neck portion 23 of the center drill 102 and slightly larger than the chucking portion 24 of the center drill 102.

The fixing structure of the center drill 102 includes a stepped portion 52 of a diameter smaller than that of the leading end of the center drill 102 and an axial width substantially equals to the thickness of the flange 50 at adjacent to the chucking portion of the center drill 102 and another stepped portion 54 (or referred to as a circumferential groove) of a smaller diameter than the stepped portion 52 at axially adjacent to the stepped portion 52.

With this structure, the flange member 50 is fitted onto the center drill 102 from its chucking end and traversed axially towards the leading end of the center drill 102 till the inner edge of the flange member 50 comes into contact with an outer edge of the stepped portion 52 and then a C-shaped stop ring 56 is fitted onto the stepped portion 54. As a result, the flange 50 is securely mounted onto the chucking portion of the center drill 102.

Next an operation of the drilling tool assembly 100 according to this invention is hereinafter described.

First of all, a drilling tool assembly 100 as a whole is rotated at a high speed through connection of a drive connecting portion 12 to the unillustrated drive mechanism then the drilling tool assembly is pressed against the work piece such as a wall. The drilling portion 22 or 22a of the center drill 102 starts machining a surface of the wall first and proceeds a drilling operation. Then the cutting tips 45A formed around the cup shape drill 101 begin drilling operation as the center drill 102 advances into the wall. Thereafter the wall is formed with the hole of a diameter approximately equal to the outer circumference of the tubular member 42 of the cup shape drill 101.

Figure 4A:
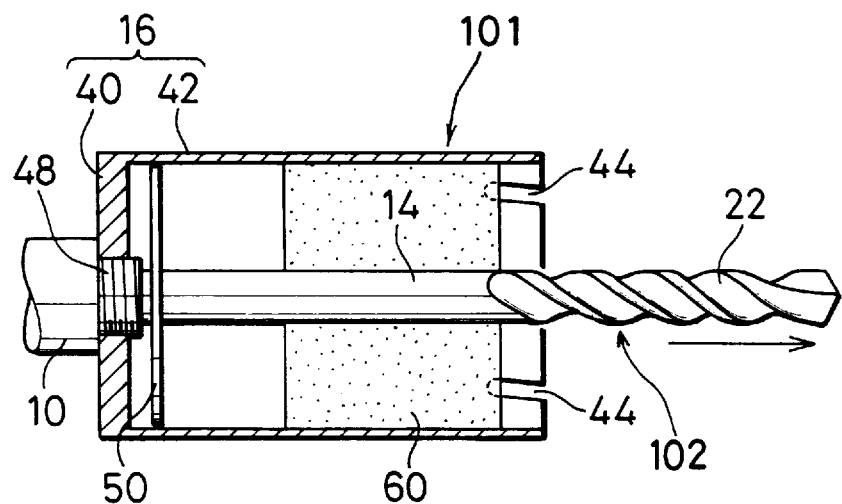
FIG. 4A is a cross sectional plan view illustrating a state where dust accumulates in a cup shape drill member.
Figure 4B:
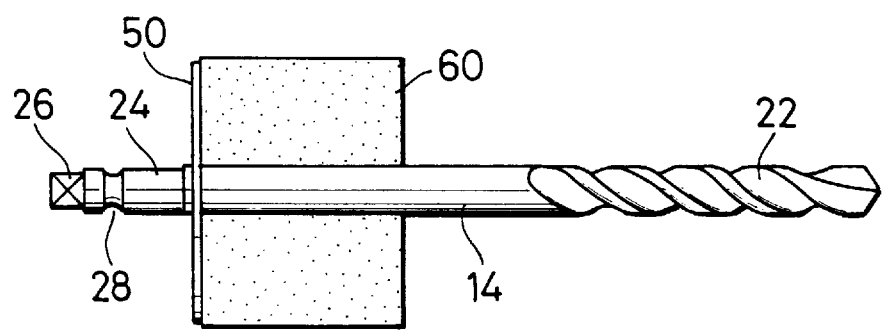
FIG. 4B is a cross sectional side view illustrating a state where the center drill together with the dust accumulation is pulled out of the cup shape drill member.
Figure 12A:
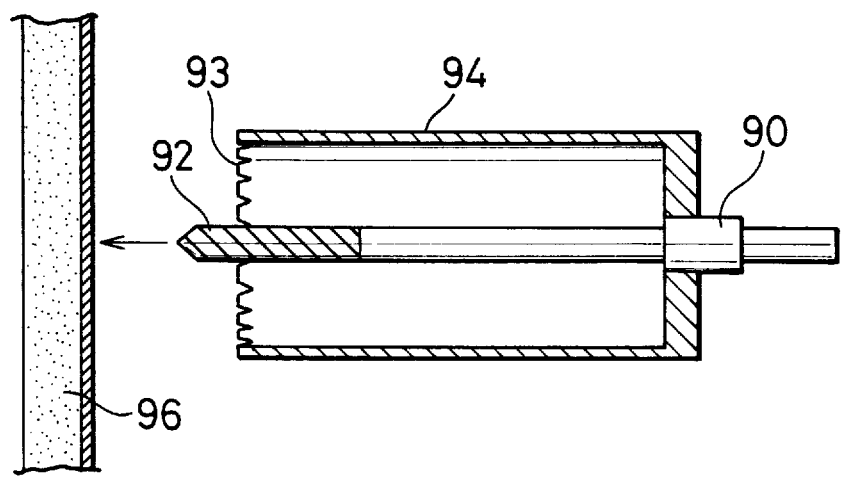
FIG. 12A is a cross sectional side view illustrating a conventional drilling tool assembly prior to the initiation drilling operation.
Figure 12B:
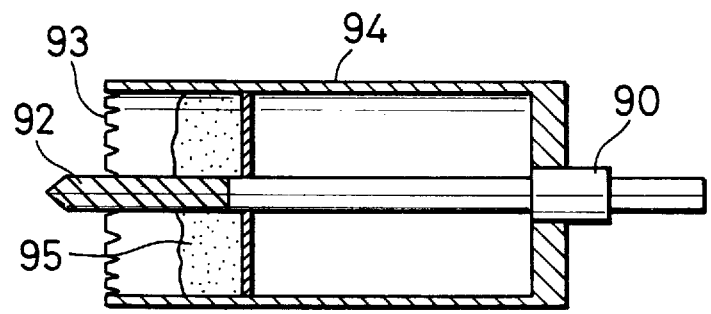
FIG. 12B is a cross sectional side view illustrating a state of dust accumulation in a cup shape drill member with the conventional drilling tool assembly.
Figure 13:
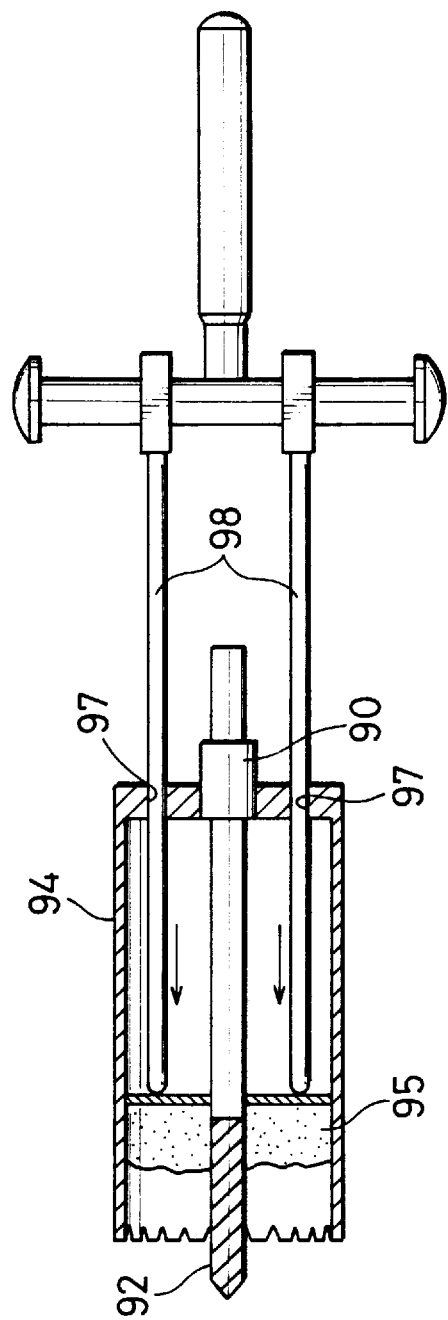
FIG. 13 is a cross sectional side view illustrating a state where the dust accumulation in the cup shape drill member of the conventional tool assembly is extracted with an extracting rod member.

After the drilling operation with this drilling tool assembly, the fragments and dust (hereinafter referred to as a dust accumulation) 60 of the wall is found stuck in the tubular member 42 as shown in FIG. 4A. At this stage, with a conventional drilling tool as shown in FIG. 12, to remove the dust accumulation out of the tubular member 42 by pulling out the center drill from the tubular member 42, it is likely to cause difficulty since there exists no projection on the center drill which can function as a dust extractor as it could engage the stuck chips. However, with the drilling tool having the flange 50 provided on the center drill 102, as the center drill 102 is pulled out from the tool holding member 10 by overcoming the resistance force generated by the balls 34 and the elastic member 36, the dust accumulation 60 is removed from the tubular member 42 as shown in FIG.4B. Thus it facilitates a preparation for the next drilling procedure.

While technically speaking, the dust accumulation in the tubular member 42 can also be extracted therefrom by removing the cup shape drill member 101 from the tool holding member 10; however, such removing operation of the cup shape drill member 101 requires a heavy task owing to its structure of larger diameter. As can be imagined, taking out of the center drill 102 from the tool holding member 10 only requires to overcome the resistance force generated by the elastic member which clamps a chucking portion of the center drill. Thus this removal operation of the center drill is much more easier than the removal operation of the cup shape drill member 101. As a result, it significantly improves a workability of the drilling operation for it could minimize a time required to clean up the cup shape drill 101.

The diameter of the flange 50 may be set such that it is smaller than the inner diameter of the tubular member 42 and should be larger than the drilling portion 22 of the center drill 102 in order for the flange portion 50 to function as a dust extractor against the dust accumulation 60. In fact it will suffice to equip a flange member 50 on the center drill 102 whose diameter is slightly larger than the diameter of the drill portion 22 of the center drill 102 to extract the dust accumulation 60 out of the cup shape drill member 101. On the other hand, it would be also possible to extract the dust accumulation 60 out of the tubular member 42 with a flange 50 mounted on the center drill 102 whose diameter is only slightly smaller than the inner diameter of the tubular member 42 (i.e., only a slight clearance is formed between the outer diameter of the flange 50 and the inner diameter of the tubular member 42). However, the another advantage with this structure is to keep much of the fine dust produced during the drilling operation on the outer side of the flange member 50 for much of the dust unlikely moves through the small clearance; therefore, the much of dust also could be extracted from the tubular member 42 as the center drill 102 is removed from the tool holding member 10.

Figure 5A:
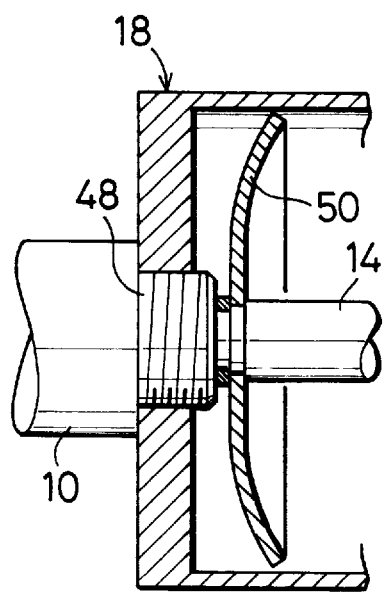
FIG. 5A is a cross sectional side view showing an alternate form of a flange member.
Figure 5B:
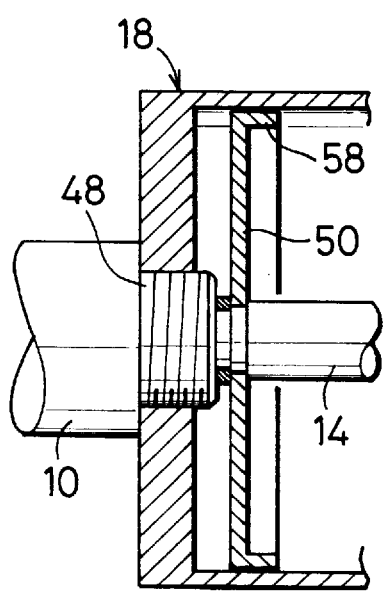
FIG. 5B is a cross sectional side view showing another form of a flange member.

Alternately, the flange 50 can be formed in the shapes shown in such as FIGS. 5A and 5B; a forward opening concave shape and a flange with a wall member 58 forwardly extending around an outer periphery of the flange member 50 respectively. These structures of the flange member have a common feature that both form a forward opening recess portion and the clearance between the outer periphery of the flange and the inner surface of the tubular member is set small thus the fine dust produced during the drilling operation can be more securely deposited in the respective concave portions.

In fact, to merely achieve the principal object of this invention that the dust and chips accumulated (dust accumulation) in the tubular member 52 are easily extracted along with the removal operation of the center drill 102, the shape of the flange 50 is not limited to the circular shape but could be in the oval, rectangular, triangular, or arbitrary polygon shape.

In the extreme case, merely placing the radially extended projection onto the neck portion of the center drill 102 will sufficiently extract the fragments accumulated in the tubular member 42. For instance, eliminating the flange member 50 from the center drill 102 and leaving the stopper ring 56 whose outer diameter is slightly larger than the diameter of the neck portion of the center drill 102 will do the extraction of the dust accumulated in the tubular member 42 along with the removal operation of the center drill 102 from the tool holder 10. Thus anything projecting radially outwardly from the neck portion of the center drill 102 function as a dust extracting member. Having mentioned about the principal feature of the dust extracting member, another form thereof is shown in FIGS. 6A to 6D.

Figure 6A:
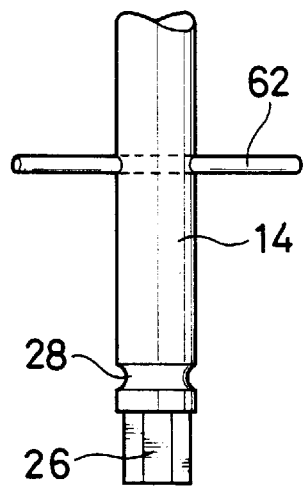
FIGS. 6A–6D each is a side view showing an alternate form of a radially projected member other than the above mentioned flange member.
Figure 6B:
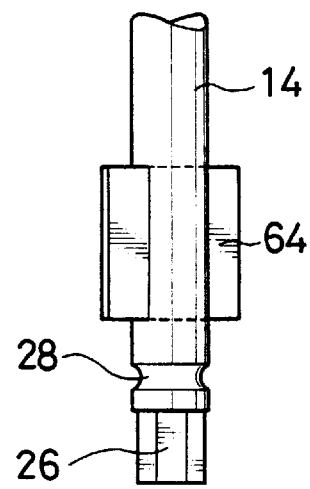

As shown in FIGS. 6A and 6B, the dust extracting member takes the shape of a pin 62 or a rectangle 64. In the case of pine 62 for the dust extracting member, merely placing the standard sized pin member to the through hole provided in the neck portion of the center drill 102 will suffice.

Figure 6C:
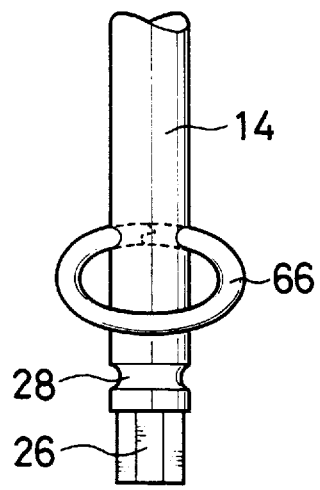
Figure 6D:
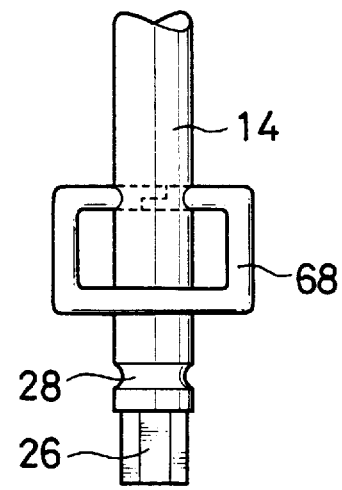

The common feature of the dust extracting members shown in FIGS. 6C and 6D is a ring member attached to the neck portion of the center drill 102. The ring members 66, 68 used for this purpose are preferably to have a cut out portion along the circumferential path of the ring such that opposite ends of the ring member can be separated from each other when placing the ring onto the neck portion and then inserted into the through hole provided on the neck portion of the center drill 102. Then the both ends of the ring are to be mated with each other in the middle of the through hole of the neck portion of the center drill 102. Such ring member can be set to pivot around the pin hole on the neck portion of the center drill 102 or firmly placed in the pin hole so that no pivot movement occurs. In either case, substantially the same effect can be achieved thus it is a matter of design choice how tight the fitness between the ring member and the pin hole in the neck portion.

Furthermore, an axial position of the dust extracting member along the center drill 102 is preferably set such that it is close to the innermost of the tubular member 42. Because it could earn sufficient axial distance from the leading end of the tubular member 42 to the dust extracting member and such axial distance is an indication of the maximum thickness of the wall (as a work piece) to be drilled with the drilling tool assembly 100.

A member to securely hold the flange member (a dust extracting member) 50 onto the center drill 102 is not limited to the aforementioned structure. For instance, the flange could be welded onto the center drill 102. However, in the case of the replacement of the tubular cutter 101 for the drilling operation with a different diameter, the flange member 50 more suitable for this different cutter may be required for easing the dust extracting operation. For adapting this situation, the replaceable flange member 50 and replaceable structure provided on the center drill 102 would be demanded. Thus the structure previously mentioned with reference to FIG. 2 including the two stepped configuration of the neck portion of the center drill 102 best suits for this demand as it allows a replacement of the another flange member 50 with a specified inner hole which adequately fit outside of the stepped portion 52.

Another form of this invention is hereinafter described with reference to FIGS. 7 to 11.

Figure 8:
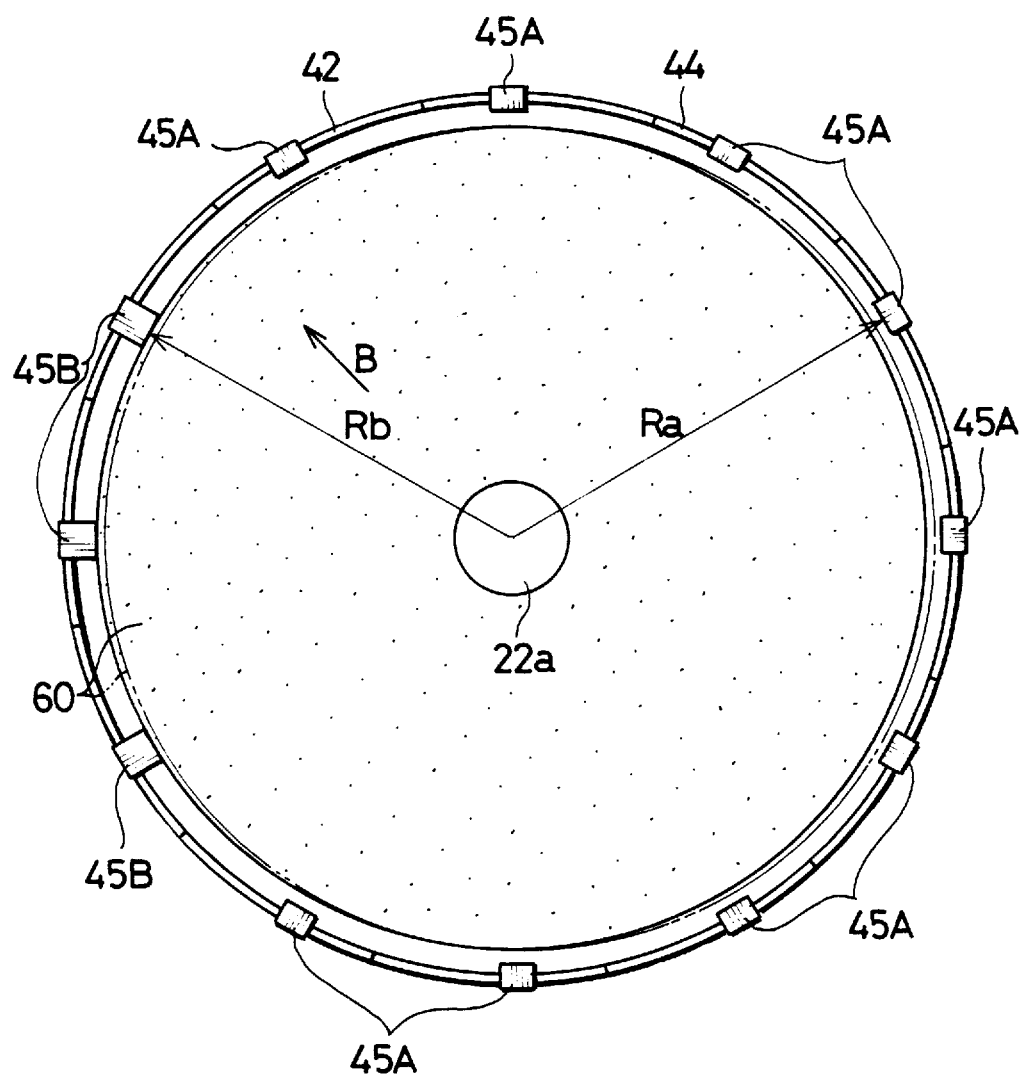
FIG. 8 is a plan view of the drilling tool assembly right after completion of the drilling operation.

In this form of embodiment, cutting tips 45A, 45B each is arranged on the edge of respective cut out portions 44 formed at the leading end of the tubular member 42. These cutting tips 45A, 45B each is formed to project forward and radially from the leading end of the tubular member 42. These cutting tips are also protruding inwardly and outwardly in the radial direction from the leading end of the tubular member 42. As shown in FIG. 8 in particular, three of cutting tips 45B are provided within the circumferential area of an angle less than 180 degree on the leading end of the tubular member (in this particular figure, the angle is about 90 degree). And the number more than the cutting tips 45B of another form of cutting tips 45A are provided in the other circumferential area of the leading end of the tubular member.

It should be noted that the radially projected amount of the cutting tip 45B (also referred to as an inwardly protruding cutting tip) to the center of the tubular member is greater than that of the cutting tip 45A (also referred to as a non-inwardly protruding cutting tip) so that a radius Rb (FIG. 8) of the inscribed circle formed by the cutting tip 45B is smaller than a radius Ra of the inscribed circle formed by the cutting tip 45A as the tubular member 42 is driven.

Figure 9:
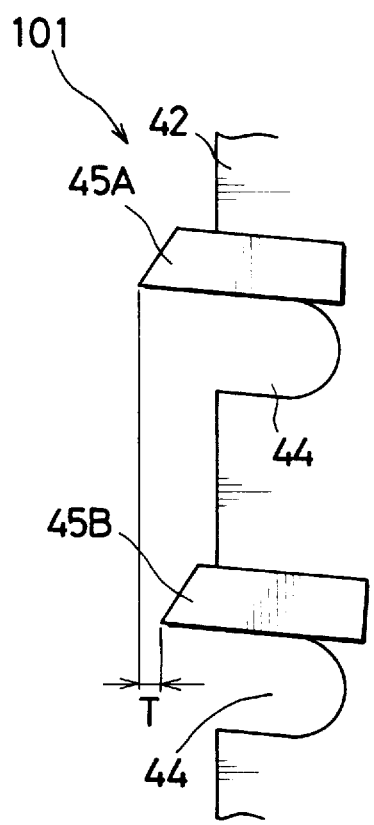
FIG. 9 is a fragmentary side view seen from a point B indicated in FIG. 8.

Furthermore, the leading end of the cutting tip 45A projects forward from the leading end of the cutting tip 45B in the axial direction of the tool by an amount (T) as shown in FIG. 9. In other words, the cutting tip 45B is positioned backward relative to the cutting tip 45A by an amount (T) in the axial direction.

These cutting tips 45A and 45B together with the aforementioned tubular body 42 constitute a cup shape drill member 101 for this invention. In addition, the cup shape drill member 101 and the aforementioned center drill 102 and the tool holding assembly 10 for holding the latter and the former constitute a drilling tool assembly 100 of this invention. Moreover, the drilling assembly 100 in the assembled state is set such that the leading end of the center drill 102 projects forward from the leading end of the cup shape drill member 101.

The drilling operation using the above mentioned drilling tool assembly is hereinafter described.

As described in the previous embodiment of this invention, first of all, the drilling tool assembly 100 is pressed against the work piece such as a wall, then the leading end of the center drill 102 begins drilling the center of the hole required to be formed. As the center drill 102 advances its drilling operation, the forward end of the cup shape drill member 101 contacts on the surface of the wall and begins drilling operation to make a hole whose diameter substantially coincides with the outer diameter of the tubular portion of the cup shape drill member. As the cup shape drill advances its drilling operation by an amount little more than the thickness of the wall, it leaves a hole in the wall with the specified diameter.

Figure 10:
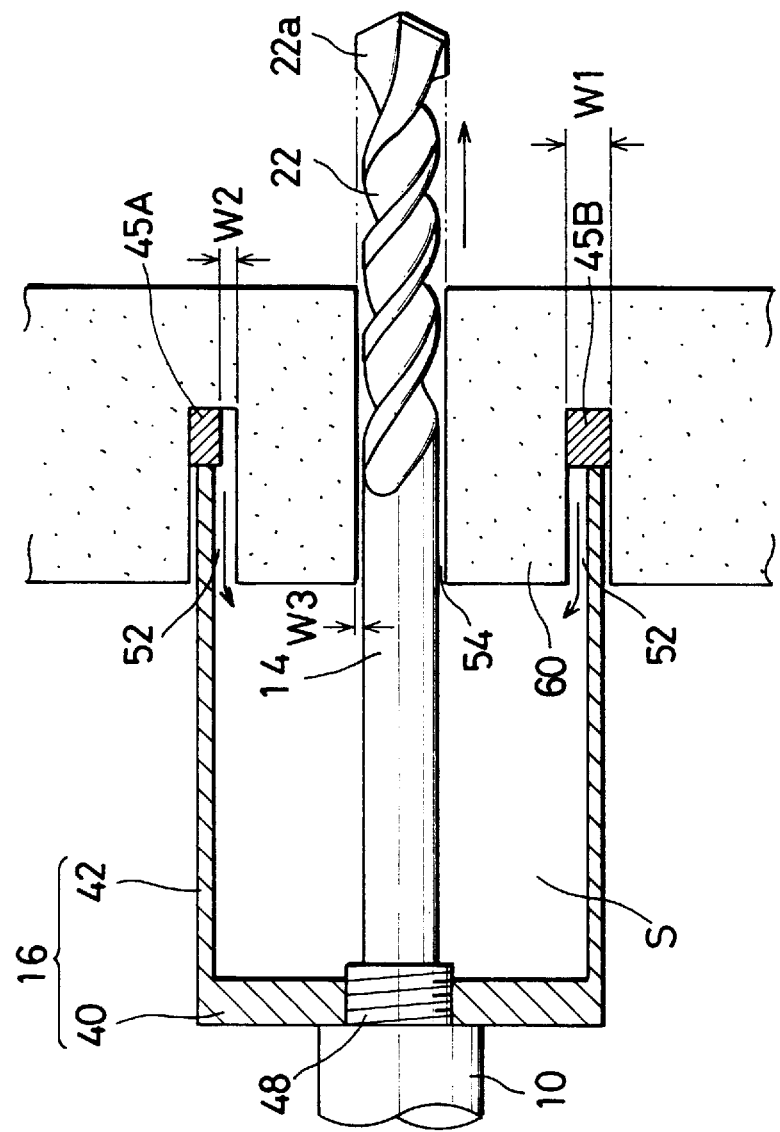
FIG. 10 is a cross sectional side view illustrating drilling operation with the drilling tool assembly according to the second embodiment of the invention.
Figure 11:
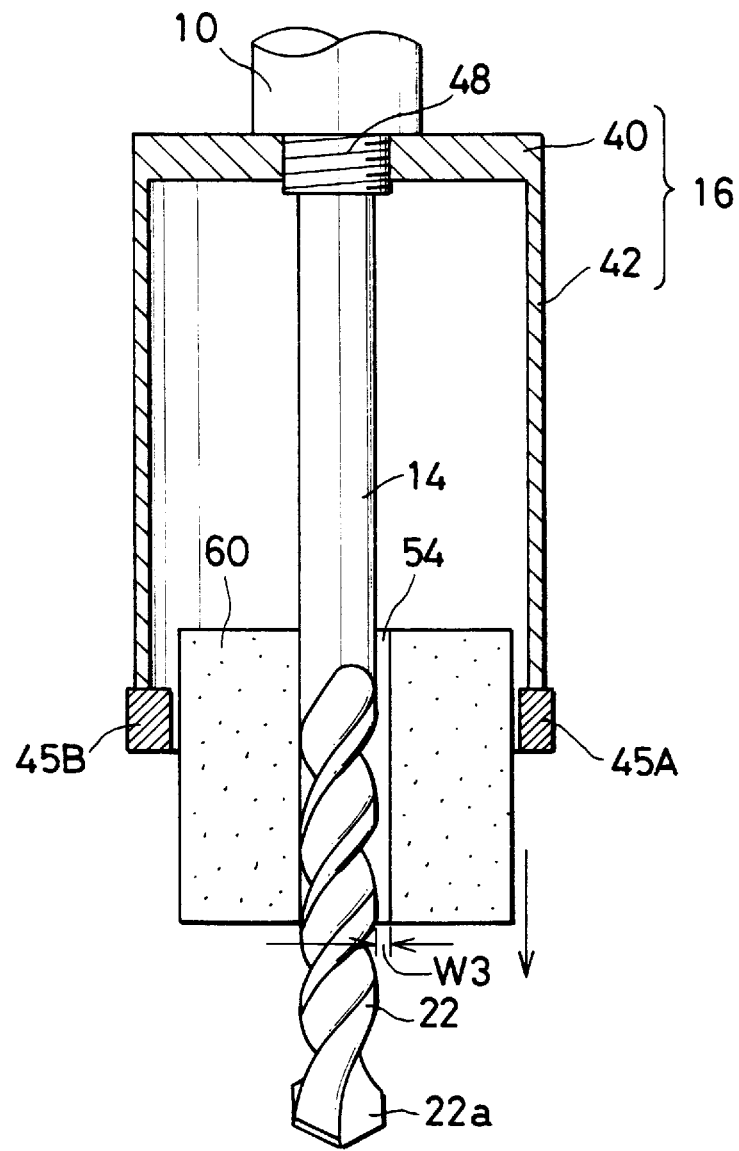
FIG. 11 is a cross sectional side view illustrating a state where a dust accumulation is extracted out of the cup shape drill member.

What actually happens in more details at the leading end of the cup shape drill member 101 when it had made contact with the wall surface is that the forward end of the cutting tips 45A first machines annular groove on the wall and subsequently the forward end of the cutting tip 45B machines with the outer surface of an inner wall of the annular groove formed by the tips 45A since the tips 45B project radially inward than the tips 45A. Thereafter the annular grove 52 of a width (W1) coinciding substantially with the radial width of the cutting tip 45B is left on the wall as shown in FIG. 10. The annular groove 52 formed in the wall to some extent functions as a passage for the cutting dust produced by the drilling operation to flow into the enclosed space S formed between the tubular member and the surface of the wall. Moreover the leading end portion 22a of the center drill 102 is set larger in diameter than the other drill portion 22 thus a clearance 54 is formed between the center drill and the drilled surface of the wall as shown in FIG. 10.

After advancing the drill tool assembly 100 in the axial direction by more than the wall thickness, it leaves a hole with a specified diameter and at this stage the drilling operation thus is completed. After the completion of drilling operation, when the drilling tool assembly is pulled out from the wall, the cylindrical shape dust accumulation 60 is expected to be formed in the tubular member 42 as shown in FIG. 4A. The dust accumulation 60 is initially stuck to the inwardly protruding cutting tips 45B, however, it can be shifted radially by a specified amount to the side opposing to where the cutting tips 45B lie by tapping the drilling tool assembly 100 since there is formed a clearance 54 (see FIG. 10) between the outer surface of the center drill and the inner diameter of the dust accumulation 60. The specified amount is determined by comparison of the width W2 and the width W3. For instance, in case that W2 is larger than W3, then the specified amount corresponds to W3.

In other words, with reference to FIG. 8 the dust accumulation 60 in a solid line can be shifted radially away from the side of cutting tips 45B to be positioned as shown by the dash and double dotted line. Once it is successfully shifted to the opposite side of the cutting tips 45B in the tubular member 42, as there exists more space in this side due to the smaller radial thickness of the cutting tips 45A, the accumulated dust can be easily extracted from the cup shape drill member 42 as the center drill 102 is removed from the tool holding member 10. Please see FIG. 11.

In this form of the embodiment, since the cutting tips 45A are projected forward from the cutting tips 45B, the drilling operation by the cutting tips 45A comes ahead of the operation by the cutting tips 45B. Furthermore, the cutting tips 45B are further projected inward from the cutting tips 45A, thus the drilling operation by the tips 45A substantially makes a subsequent drilling operation by the cutting tips 45B loadless towards an axially advancing direction of the drilling tool assembly. Thus only the drilling operation carried out by the cutting tips 45B is an machining of the outer surface of the groove already made by the cutting tips 45A to secure the clearance noted by W3 shown in FIG. 10. Once again this clearance generally noted by 52 in FIG. 10 enhances a dust flow into the enclosed space S thereby enabling to increase a drilling speed to some extent.

Furthermore, the number of the inwardly protruding cutting tips 45B is preferably less than a half of total number of the tips including all the cutting tips 45A, 45B. Technically speaking only one cutting tip in the type of 45B with the rest in the type of 45A will do the extracting operation. As long as the inwardly protruding cutting tips 45B lie within the half of circumference of the tubular member 42, any possible arrangements of tips therein would not deteriorate the performance of this drilling operation. As maybe obvious by this stage, the inwardly protruding cutting tips 45B should not be dispersed beyond 180 degree apart among each other since the accumulated dust could not be radially shifted by the specified amount to the other side of the cutting tip 45B if there were another cutting tip 45B on the other side. It may be preferable to dispose a plurality of the cutting tips of 45B in the circumferential area of smaller angle so that the dust generated by the drilling operation flows easily through the clearance 52 thereby improving a drilling operation. Furthermore, with this arrangement a radial shifting operation of the accumulated dust in the tubular member 42 after completion of the drilling operation just before extracting the center drill 102 out of the tubular member 42 is made easier.

It should be noted that in case that the center drill 102 has a leading end with a diameter of substantially equal to the other drill portion (i.e., there is created almost no clearance 54 between the center drill 102 and the drilled hole of the wall) then the center drill can be pulled out of the tubular member 42 at the middle of the drilling operation or after completion of the drilling operation to leave the dust accumulation in the tubular member 42. Thereafter the accumulated dust 60 left behind in the tubular member 42 can be shifted radially to be easily pulled out from the tubular member.

Although the present invention has been fully described by way of examples with reference to drawings, it is to be understood various changes and modifications will be apparent to those skilled in the art without departing from the spirit and scope of the present invention. Accordingly, the invention should not be limited by the foregoing description but rather should be defined only by the following claims.

What is claimed is:

1. A cup shape drilling tool assembly comprising:
   a cup shape drill member including tip on a leading end thereof;
   a center drill partially enclosed in the cup shape drill member in a side view thereof, including;
   a drill portion formed on a leading end of the center drill,
   a dust extractor radially outwardly extending from a portion of the center drill lying in the sup shape drill member
   a tool chucking device for securely holding the center drill at a middle of the cup shape drill member in a plan view.

2. A cup shape drilling tool assembly according to claim 1, wherein the dust extractor includes a flange having a diameter greater than an outer diameter of the drill portion of the center drill and less than an inner diameter of the cup shape drill member.

3. A cup shape drilling tool assembly according to claim 2, wherein the flange has a diameter substantially equal to the inner diameter of the cup shape drill member.

4. A cup shape drilling tool assembly according to claim 2, wherein the flange has a concave shape.

5. A cup shape drilling tool assembly according to claim 1, wherein the dust extractor is disposed along a circumference of the center drill.

6. A cup shape drilling tool assembly according to claim 1, wherein the dust extractor extends through the center drill.

7. A cup shape drilling tool assembly according to claim 1, wherein the dust extractor includes a ring encircling the center drill.

8. A cup shape drilling tool assembly according to claim 1, wherein the dust extractor includes a split ring having ends that meet within a through-hole formed in the center drill.

9. A cup shape drilling tool assembly according to claim 1, wherein the dust extractor is detachably attached to the center drill.

10. A cup shape drilling tool assembly comprising:
   a cup shape drill member including
      a plurality of cutting tips provided on a periphery of an opening end of the cup shape drill member, having at least one inwardly protruding tip which projects further radially inwardly of the rest of the cutting tips and all the inwardly protruding tips lie in an arc of 180 degree at one end of the cup shape drill member;
   a center drill partially enclosed in the cup shape drill member in a side view thereof, including;
      a drill portion formed on a leading end of the center drill projects axially outwardly from the opening end of the cup shape drill member,
   a tool chucking device for securely holding the center drill at a middle of the cup shape drill member in a plan view.

11. A cup shape drilling tool assembly according to claim 10, wherein the center drill is detachably attached to the tool chucking device.

12. A cup shape drilling tool assembly according to claim 10, wherein a diameter of the drill portion is set larger than that of an axially rearward portion of the center drill.

13. A cup shape drilling tool comprising:
   a tubular body having a leading end;
   first cutting tips provided at the leading end of the tubular body and protruding radially inward; and
   second cutting tips provided at the leading end of the tubular body and protruding radially inward, wherein the second cutting tips protrude radially inward farther than the first cutting tips, each of the second cutting tips protrude radially inward a substantially equal distance, and all of the second cutting tips arranged in an arc of no more than 180 degrees.

14. A cup shape drilling tool according to claim 13, wherein the second cutting tips are arranged in an arc of no more than 60 degrees at the leading end of the tubular body.

15. A cup shape drilling tool according to claim 13, wherein the second cutting tips are arranged successively on the leading end of the tubular body.

16. A cup shape drilling tool according to claim 13, wherein the second cutting tips are substantially identical in shape.

17. A cup shape drilling tool according to claim 13, wherein the first cutting tips protrude farther than the second cutting tips along a longitudinal axis of the tubular body.

* * * * *